(12) United States Patent
Hamilton, II et al.

(10) Patent No.: US 9,021,368 B2
(45) Date of Patent: *Apr. 28, 2015

(54) SYSTEM AND METHOD FOR VIRTUAL ENVIRONMENT PRESERVATION BASED ON AUTOMATED ITEM REDUCTION

(75) Inventors: Rick A. Hamilton, II, Charlottesville, VA (US); Neal M. Keller, Pleasantville, NY (US); Clifford A. Pickover, Yorktown Heights, NY (US); Brian M. O'Connell, Cary, NC (US); Keith R. Walker, Austin, TX (US)

(73) Assignee: International Business Machines, Armonk, NY (US)

( * ) Notice: Subject to any disclaimer, the term of this patent is extended or adjusted under 35 U.S.C. 154(b) by 211 days.

This patent is subject to a terminal disclaimer.

(21) Appl. No.: 13/587,245

(22) Filed: Aug. 16, 2012

(65) Prior Publication Data

US 2012/0311464 A1    Dec. 6, 2012

Related U.S. Application Data

(63) Continuation of application No. 12/328,298, filed on Dec. 4, 2008, now Pat. No. 8,352,871.

(51) Int. Cl.
  *G06F 3/00* (2006.01)
  *G06Q 30/00* (2012.01)
  *G06Q 10/04* (2012.01)
  *G06Q 10/10* (2012.01)

(52) U.S. Cl.
  CPC ............... *G06Q 30/00* (2013.01); *G06Q 10/04* (2013.01); *G06Q 10/10* (2013.01)

(58) Field of Classification Search
  USPC .............................. 715/751; 705/26
  See application file for complete search history.

(56) References Cited

U.S. PATENT DOCUMENTS

| | | | |
|---|---|---|---|
| 5,560,003 A | | 9/1996 | Nilsen et al. |
| 5,592,597 A | * | 1/1997 | Kiss .............................. 345/419 |
| 5,692,185 A | | 11/1997 | Nilsen et al. |
| 5,802,296 A | | 9/1998 | Morse et al. |
| 5,956,039 A | | 9/1999 | Woods et al. |
| 6,088,035 A | | 7/2000 | Sudarsky et al. |
| 6,141,003 A | | 10/2000 | Chor et al. |
| 6,219,045 B1 | | 4/2001 | Leahy et al. |
| 6,417,869 B1 | | 7/2002 | Do |
| 6,587,127 B1 | | 7/2003 | Leeke et al. |
| 6,763,371 B1 | | 7/2004 | Jandel |
| 6,983,283 B2 | | 1/2006 | Sowizral et al. |
| 7,047,213 B2 | | 5/2006 | Haynes et al. |

(Continued)

OTHER PUBLICATIONS

Notice of Allowance dated Aug. 31, 2012 in U.S. Appl. No. 12/328,298, 7 pages.

*Primary Examiner* — Boris Pesin
*Assistant Examiner* — Matthew Ell
(74) *Attorney, Agent, or Firm* — Lisa Ulrich; Roberts Mlotkowski Safran & Cole, P.C.

(57) ABSTRACT

A method implemented in a computer infrastructure having computer executable code, includes detecting one of an absence of a virtual universe (VU) occurrence in a VU within a predetermined time period, a special event in the VU and a change of real world status from a previous real world status. Additionally, the method includes determining a VU asset of a VU resident relevant to the VU occurrence, the special event or the previous real world status. Further, the method includes performing an automated asset reduction of the VU asset based on the determining.

12 Claims, 8 Drawing Sheets

(56) References Cited

U.S. PATENT DOCUMENTS

| | | |
|---|---|---|
| 7,143,124 B2 | 11/2006 | Garthwaite |
| 2003/0078792 A1 | 4/2003 | Koss |
| 2005/0086318 A1 | 4/2005 | Aubault |
| 2007/0179867 A1 | 8/2007 | Glazer et al. |
| 2007/0208751 A1 | 9/2007 | Cowan et al. |
| 2008/0004094 A1 | 1/2008 | Mueller et al. |
| 2008/0115087 A1 | 5/2008 | Rollin et al. |
| 2008/0144079 A1 | 6/2008 | Pandey et al. |
| 2008/0249897 A1 | 10/2008 | Oh et al. |
| 2009/0109228 A1 | 4/2009 | Shuster |

* cited by examiner

| RelationshipID | InventoryUUID | Boundary | TimeInBoundary |
|---|---|---|---|
|  |  |  |  |
|  |  |  |  |
|  |  |  |  |
|  |  |  |  |
|  |  |  |  |

Figure 2

| InventoryConversationID | InventoryUUID | AvatarUUID | TimeWithAvatar | NumberOfReveals |
|---|---|---|---|---|
| 305 | 310 | 315 | 320 | 325 |
| | | | | |
| | | | | |
| | | | | |
| | | | | |
| | | | | |
| | | | | |

Figure 3

| InventoryContextID | ContextUUID | InventoryUUID | TimeInContext |
|---|---|---|---|
| | | | |
| | | | |
| | | | |
| | | | |
| | | | |
| | | | |

Figure 4

| InventoryTransportID | TransportUUID | InventoryUUID | TimeWithTransport |
|---|---|---|---|
| | | | |
| | | | |
| | | | |
| | | | |
| | | | |
| | | | |

Figure 5

SYSTEM AND METHOD FOR VIRTUAL ENVIRONMENT PRESERVATION BASED ON AUTOMATED ITEM REDUCTION

CROSS REFERENCE TO RELATED APPLICATION

The present application is a continuation of U.S. application Ser. No. 12/328,298, filed Dec. 4, 2008, the contents of which are incorporated by reference herein in their entirety.

FIELD OF THE INVENTION

The present invention generally relates to computer-based virtual universes, and more specifically, to a method and system for virtual environment preservation based on automated item reduction.

BACKGROUND

Virtual universes (VUs) are rapidly becoming a popular part of today's culture. A VU is a computer-based simulated environment. Many VUs are represented using 3-D graphics and landscapes, and are populated by many thousands of users, known as "residents". Often, the VU resembles the real world such as in terms of physics, places, and landscapes.

VUs are also known as metaverses and "3D Internet." Some example VUs include: SECOND LIFE™, ENTROPIA UNIVERSE®, THE SIMS ONLINE™ and THERE™—as well as massively multiplayer online games such as EVERQUEST®, ULTIMA ONLINE™, LINEAGE® and WORLD OF WARCRAFT®. (SECOND LIFE is a trademark of Linden Research, Inc. in the United States and/or other countries. ENTROPIA UNIVERSE is a registered trademark of MindArk PE AB in the United States, other countries, or both. THE SIMS ONLINE and ULTIMA ONLINE are trademarks of Electronic Arts, Inc. in the United States, other countries, or both. THERE is a trademark of Makena Technologies, Inc. in the United States, other countries, or both. EVERQUEST is a registered trademark of Sony Corporation of America, Inc. in the United States, other countries, or both. LINEAGE is a registered trademark of NCsoft Corporation in the United States, other countries, or both. WORLD OF WARCRAFT is a registered trademark of Blizzard Entertainment, Inc. in the United States, other countries, or both.)

A VU is intended for its residents to traverse, inhabit, and interact through the use of avatars. In operation, user(s) control the avatar(s). An avatar is a graphical representation selected by the user, often taking the form of a cartoon-like human or other figure. The user's account, upon which the user can build an avatar, is tied to an inventory of assets the user owns, such as, for example, clothing, weapons, artwork, furniture, virtual pets, houses, virtual vehicles, and landmarks, amongst other assets. A region is a virtual area of land within the VU, typically residing on a server's central processing unit (CPU). A user context includes a very broad range of attributes that describe the user and which are relevant to their behavioral, search and other informational needs.

The data representation of an object or item in the VU is stored as information, e.g., as data or metadata. The object may be created by an object creator, e.g., a VU manager, a user, etc. In some virtual universes, larger objects are constructed of smaller objects, termed "prims" for primitive objects. These "prims" usually include boxes, prisms, spheres, cylinders, tori, tubes and/or rings. The "prims" may be rearranged, resized, rotated, twisted, tapered, dimpled and linked to create larger composite objects. The creator of such an object may then map a texture or multiple textures to the object. Texture mapping is a method of adding detail, surface texture, or color to a computer-generated graphic or 3D model. When the object is to be rendered, this information is transmitted from the VU server to the client.

An inventory of assets comprises objects associated with the user's individual avatar or placed by the user on virtual land they own or on public land. Such objects may have been created by the user from prims, purchased, or obtained for free. Examples of objects include clothing, weapons, artwork, furniture, virtual pets, houses, virtual vehicles, and landmarks, amongst other objects. Assets, avatar(s), the environment, and everything else visually represented in the VU each comprise universally unique identifiers (UUIDs) (tied to geometric data distributed to user(s) as textual coordinates), textures (distributed to user(s) as graphics files), and effects data (rendered by the user's client according to the user's preference(s) and user's device capabilities).

SUMMARY OF THE INVENTION

In a first aspect of the invention, a method implemented in a computer infrastructure having computer executable code tangibly embodied on a computer readable medium, comprises detecting one of an absence of a virtual universe (VU) occurrence in a VU within a predetermined time period, a special event in the VU and a change of real world status from a previous real world status. Additionally, the method comprises determining a VU asset of a VU resident relevant to the VU occurrence, the special event or the previous real world status. Further, the method comprises performing an automated asset reduction of the VU asset based on the determining.

In another aspect of the invention, a system comprises a virtual universe (VU) monitoring tool configured to detect one of an absence of a virtual universe (VU) occurrence in a VU within a predetermined time period, a special event in the VU and a change of real world status from a previous real world status, and determine a VU asset of a VU resident relevant to the VU occurrence, the special event or the previous real world status. Additionally, the system comprises at least one of an asset deletion tool configured to delete the VU asset, an asset graphical characteristics alteration tool configured to alter a graphical characteristic of the VU asset, and an asset archival storage tool configured to archive the VU asset in a storage system and remove the VU asset from the VU resident's inventory or a VU landscape.

In an additional aspect of the invention, a computer program product comprising a computer usable storage medium having readable program code embodied in the medium is provided. The computer program product includes at least one component to detect one of an absence of a virtual universe (VU) occurrence in a VU within a predetermined time period, a special event in the VU and a change of real world status from a previous real world status. Additionally, the at least one component determines a VU asset of a VU resident relevant to the VU occurrence, the special event or the previous real world status. Further, the at least one component performs an automated asset reduction of the VU asset based on a detection of the absence of one of the VU occurrence, the special event and the change of real world status, and a determining the VU asset of the VU resident relevant to the VU occurrence, the special event or the previous real world status.

In a further aspect of the invention, a method comprises providing a computer infrastructure operable to detect one of an absence of a virtual universe (VU) occurrence in a VU within a predetermined time period, a special event in the VU and a change of real world status from a previous real world status. Additionally, the computer infrastructure is operable to determine a VU asset of a VU resident relevant to the VU occurrence, the special event or the previous real world status. Further, the computer infrastructure is operable to perform an automated asset reduction of the VU asset to maintain a primitive objects (prim) load of the VU beneath a prim load limit of the VU based on a detection of the absence of one of the VU occurrence, the special event and the change of real world status.

BRIEF DESCRIPTION OF THE DRAWINGS

The present invention is described in the detailed description which follows, in reference to the noted plurality of drawings by way of non-limiting examples of exemplary embodiments of the present invention.

FIGS. 2-5 show exemplary data tables for associating VU items with regions of the VU, VU collaborations, user contexts and modes of transportation in the VU in accordance with the invention.

DETAILED DESCRIPTION OF THE INVENTION

Figure 1:
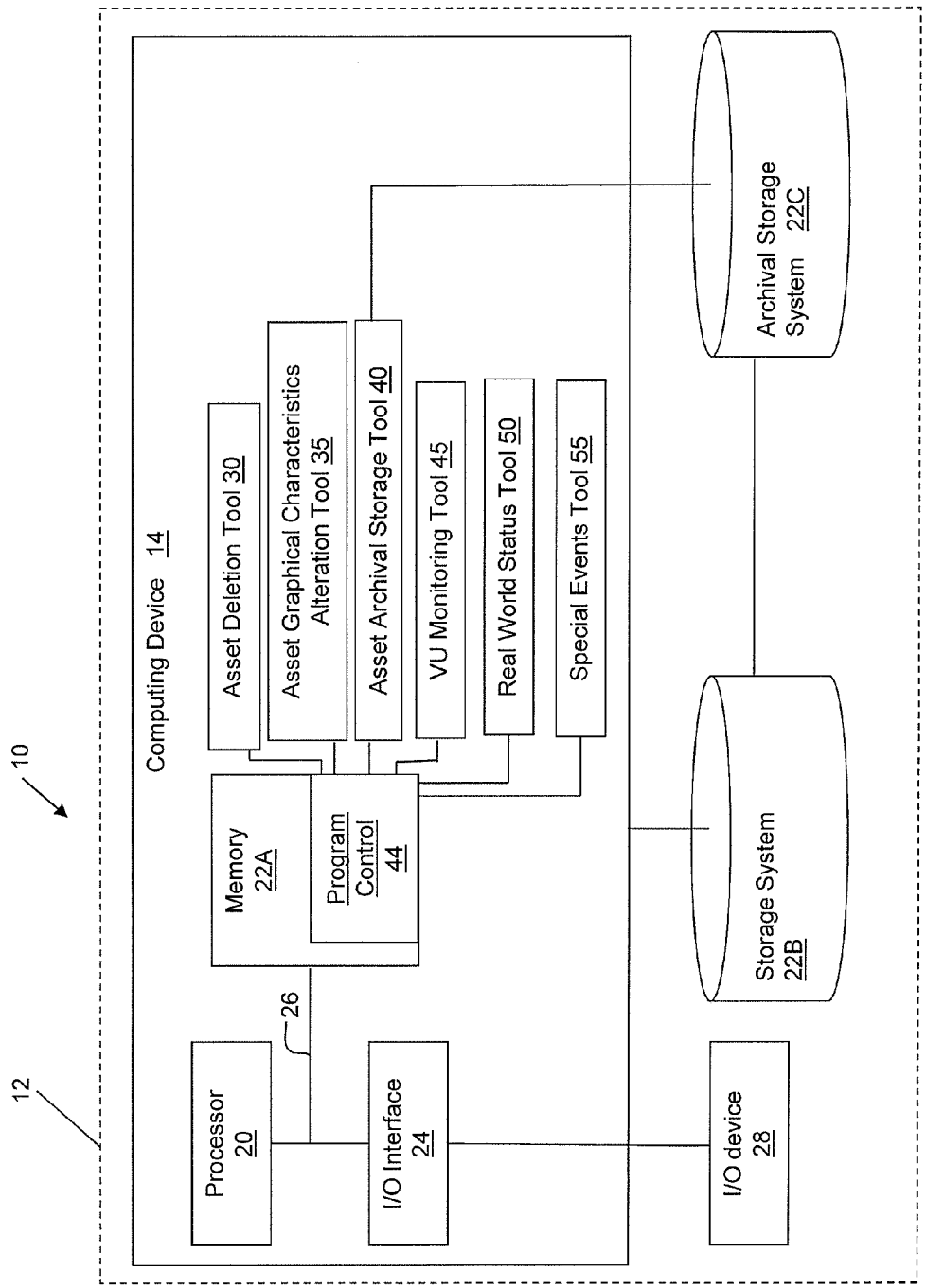
FIG. 1 shows an illustrative environment for implementing the steps in accordance with the invention.

The present invention generally relates to computer-based virtual universes (VUs), and more specifically, to a method and system for virtual environment preservation based on automated item reduction. For example, the present invention provides automatic, criteria-based methods for asset reduction. In embodiments, the methods for asset reduction may include removing or deleting the assets, changing the assets' graphical characteristics to reduce computational load, or archiving the assets. Additionally, specific identified criteria, including combinations of real world and virtual world criteria, may be used as triggers for asset reduction.

The number of available resources such as landmarks, events, retail stores, services, and other avatars (who might serve business and personal needs) is proliferating in VUs. Due to this proliferation, users' avatars accumulate personal inventory items and assets that are placed on the landscape by receiving them for free, purchasing them, or constructing them from prims. Over time, however, while VU users' interests and needs may change, and certain assets used directly by their avatars, such as clothing, or assets that are placed on virtual private or public land are, e.g., no longer relevant or useful to the needs of residents, companies, or other businesses, VU users continue to maintain these, e.g., irrelevant or less useful assets.

As a result, VUs are becoming overwhelmed by assets (e.g., asset or inventory clutter) in the form of avatar personal inventory items and objects placed on virtual land. For this reason, residents may have difficulty finding relevant assets. Additionally, the overall performance of the VU may be negatively impacted.

Also, asset clutter affects individual users by increasing the difficulty for them to locate relevant assets. Additionally, due to asset clutter, the demands on the VU infrastructure may be increased. Asset clutter affects the overall performance of virtual universes, because of the computationally intensive nature of rendering these assets. As an example of the impact of such computing resource limitations, a large enterprise recently sent out an urgent message to employees with avatars and objects on enterprise owned islands in a VU, urging them to reduce their prims as soon as possible.

In addition, there may be computing resource limitations associated with, for example, a VU land of a specific size, which may preclude use of the VU land for special events, involving, e.g., a temporary influx of additional avatars and their associated personal inventory items. That is, if a VU land is to be used for a special event, and planners anticipate that the special event will create an influx of VU residents to the VU land, this influx may cause a prim limit to be exceeded.

Within VUs, manual methods are known for reducing asset clutter for inventory management. Recommended asset clutter solutions include a number of suggestions for inventory management, including:

1. Organize inventory contents regularly. Do not keep two copies of the same, replicable item in inventory since they may be copied again from the public library object collection if needed.
2. Use subfolders to organize inventory contents.
3. Do not carry objects not likely to be used in the near future. Use the trash function to delete everything you probably won't use. Empty the trash at the conclusion of every SL session. The items in the trash can take up as much space as they did in their original folders.
4. Make a backup copy of the primary avatar's Inventory. Put it in a storage prim outside the primary avatar's inventory, or copy folders and items into an alternate avatar's inventory.
5. The debug menu will provide a list of everything identified by Second Life which is considered "clothing" (or whatever other category is selected) and can be removed to trash directly from the list.
6. Sort all inventory folders and items by date of acquisition and decide to store older creations outside of active inventory.
7. Create a storage prim to remove items in certain categories from active inventory. Items can be copied back into the resident's inventory when needed. Stores such as THiNC (http://thincsl.com/category/products/inventory-box-organizer/) provide specialized inventory management aids including specialized security boxes for textures and for photos.
8. Storage prims can be place on a user's rented or owned property and also be copied to a friend's inventory in case the primary inventory gets corrupted.
9. Obtain a second user account and create an alternate avatar. Use the Search function to directly transfer some inventory items from the primary avatar to the alternate.

While these asset management techniques describe manual methods to enable residents to delete or archive categories of assets, they fail to address a number of situational criteria for automatic asset reduction that span a number of the asset categories addressed by these previously disclosed manual methods. These manual methods also require significant effort by users who do not perform such cleanups often.

By implementing the present invention, VU residents may more easily locate assets due to the reduction of asset clutter. Additionally, VU residents will experience improved overall performance in the VU including reduced time to load their inventory. VU service providers will also need fewer computing resources to provide a responsive immersive environment and will have the flexibility to host special events without concerns about performance issues or denial of access to specific virtual lands because of prim overload. Further, through reduced asset clutter, increased performance and enhanced relevance, businesses may be able to satisfy and service customer needs (and create a good impression).

System Environment

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following:
- an electrical connection having one or more wires,
- a portable computer diskette,
- a hard disk,
- a random access memory (RAM),
- a read-only memory (ROM),
- an erasable programmable read-only memory (EPROM or Flash memory),
- an optical fiber,
- a portable compact disc read-only memory (CDROM),
- an optical storage device,
- a transmission media such as those supporting the Internet or an intranet, or
- a magnetic storage device.

The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet Service Provider).

FIG. 1 shows an illustrative environment 10 for managing the processes in accordance with the invention. To this extent, the environment 10 includes a computer infrastructure 12 that can perform the processes described herein using a computing device 14. The computing device 14 includes an asset deletion tool 30, an asset graphical characteristics alteration tool 35, an asset archival storage tool 40, a VU monitoring tool 45, a real world status tool 50 and a special events tool 55. These tools are operable to facilitate the deletion of assets, the alteration of graphical characteristics of assets, the archival storage of assets, the monitoring of the VU, the indication of a change in real world status, and the indication of the occurrence of a special event in the VU, e.g., the processes described herein.

The computing device 14 includes a processor 20, a memory 22A, an input/output (I/O) interface 24, and a bus 26. The memory 22A can include local memory employed during actual execution of program code, bulk storage, and cache memories which provide temporary storage of at least some program code in order to reduce the number of times code must be retrieved from bulk storage during execution. Further, the computing device 14 is in communication with an external I/O device/resource 28. The external I/O device/resource 28 may be keyboards, displays, pointing devices, etc. The I/O device 28 can interact with the computing device 14 or any device that enables the computing device 14 to communicate with one or more other computing devices using any type of communications link. Additionally, in embodiments, the computing device 14 includes a storage system 22B and an archival storage system 22C.

The processor 20 executes computer program code (e.g., program control 44), which is stored in memory 22A and/or storage system 22B. Program control 44 executes processes and is stored on media, as discussed herein. While executing computer program code, the processor 20 can read and/or write data to/from memory 22A, storage system 22B, and/or I/O interface 24. The bus 26 provides a communications link between each of the components in the computing device 14.

The computing device 14 can comprise any general purpose computing article of manufacture capable of executing computer program code installed thereon (e.g., a personal computer, server, handheld device, etc.). However, it is understood that the computing device 14 is only representative of various possible equivalent computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computer infrastructure 12 is only illustrative of various types of computer infrastructures for implementing the invention. For example, in embodiments, the computer infrastructure 12 comprises two or more computing devices (e.g., a server cluster) that communicate over any type of communications link, such as a network, a shared memory, or the like, to perform the processes described herein. Further, while performing the processes described herein, one or more computing devices in the computer infrastructure 12 can communicate with one or more other computing devices external to computer infrastructure 12 using any type of communications link. The communications link can comprise any combination of wired and/or wireless links;

any combination of one or more types of networks (e.g., the Internet, a wide area network, a local area network, a virtual private network, etc.); and/or utilize any combination of transmission techniques and protocols.

In embodiments, the computer infrastructure 12 may communicate with another computer infrastructure (not shown), which is operating the VU. However, the invention contemplates that the computer infrastructure 12 may operate the asset deletion tool 30, the asset graphical characteristics alteration tool 35, the asset archival storage tool 40, the VU monitoring tool 45, the real world status tool 50 and the special events tool 55 and operate the VU.

In embodiments, the invention provides a business method that performs the steps of the invention on a subscription, advertising, and/or fee basis. That is, a service provider, such as a Solution Integrator, could offer to perform the processes described herein. In this case, the service provider can create, maintain, deploy, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

Asset Reduction

The present invention provides automatic, criteria-based methods for asset reduction. The inventive methods provide several asset reduction options, including: permanent or semi-permanent reduction (deletion) of identified assets, changing graphical characteristics of identified assets and temporary reduction of assets via archival storage.

According to an aspect of the invention, the asset deletion tool 30 may automatically permanently or semi-permanently reduce (e.g., delete) identified assets of a user using a "recycle bin/trash" in a VU. In a VU, this may be accomplished, for example, by teleporting an item to the "trash dump" or "storage closet" region, to which, for example, an avatar may visit for a period of time after deleting or reducing inventory. Additionally, in embodiments, the asset deletion tool 30 may move these identified assets to a recycle/trash bin on the end user's computer. Additionally, scripts (e.g., programs) may be associated with objects. In embodiments, these associated scripts may be separated from the objects and handled separately.

According to a further aspect of the invention, with a second asset reduction method, the asset graphical characteristics alteration tool 35 may alter the graphical characteristics of identified assets, such as, for example, texture mapping detail or color, amongst other graphical characteristics, to reduce the computational load on the VU. For example, the asset graphical characteristics alteration tool 35 may reduce the number of facets that compose an object to create a lower-resolution version (that, for example, requires less computational load to render in the VU). Additionally, for example, the asset graphical characteristics alteration tool 35 may eliminate textures to create monochrome objects. In embodiments, the asset graphical characteristics alteration tool 35 may perform some of these reductions gradually so that users have visual indication of their lesser used objects. For example, the asset graphical characteristics alteration tool 35 may control an object to flash, blink or fade for a time before the asset graphical characteristics alteration tool 35 alters the object into, e.g., a low-resolution mode.

According to a further aspect of the invention, with a third asset reduction method, the asset archival storage tool 40 may reduce assets via moving the assets to a secondary archival storage, e.g., the archival storage system 22C. The off-load (or moving) of assets to this secondary archival storage system 22C reduces the demand on a VU main storage and/or a database, e.g., storage system 22B. In embodiments, the asset archival storage tool 40 may provide a user an option for later access and restoration of the temporarily reduced asset. Additionally, in embodiments, this secondary archival storage system 22C, e.g., a database, may be based on some cheaper and/or slower technology.

VU Triggers for Asset Reduction

According to a further aspect of the invention, a VU monitoring tool 45 may monitor specific identified criteria including, for example, a combination of real world and VU criteria. Additionally, in embodiments, the VU monitoring tool 45 may use the specific identified criteria as triggers for asset reduction. The first four criteria involve the determination of relevance in four dimensions in the VU: 1) relevance to landscape; 2) relevance to collaboration with other VU residents; 3) relevance to user context; and 4) relevance to mode of transportation. In each of the respective dimensions, the method used to determine relevance will vary by embodiment, but all potential methods used with the inventive system should have the aim of associating VU items with VU residents.

1. Reduction by Relevance to Landscape

In embodiments, the VU monitoring tool 45 may determine if a region has not been visited by a specific resident within a preset duration. If the VU monitoring tool 45 determines that the specific resident has not been to that region within the preset duration, the VU monitoring tool 45 may determine that an item is relevant or related to that particular land or region of the VU. Additionally, the VU monitoring tool 45 may direct the reduction of the relevant asset or item. For example, the VU monitoring tool 45 may direct the asset archival storage tool 40 to move the relevant inventory items for that resident to the archival storage system 22C.

In embodiments, the VU monitoring tool 45 may determine relevance of items to landscape by associating VU items with residents and regions. For example, with an exemplary method, the VU monitoring tool 45 may determine that an item is relevant or related to a particular land or region if the user placed the object and left the item in the particular land or region, and the user is the only resident who has used that item on that land. With another exemplary method, the VU monitoring tool 45 may determine that an item is relevant to a particular land or region if the item was purchased or acquired for free on a previous visit to that land or region (or elsewhere) and the content of the inventory item is specific to that land or region (e.g., tourist map of that land or region).

In an exemplary method, the VU monitoring tool 45 may monitor region visitation by resident and determine whether the region has been visited by the resident within a predefined time period. In embodiments, the predefined time period may be configurable by, e.g., the user, a VU service provider or an asset reduction service provider. With an exemplary method, the VU monitoring tool 45 may keep track of region names in a database, e.g., storage system 22B, with a visit counter that specifies, for example, the number of times or hours a user spends in that region.

If the VU monitoring tool 45 determines that a resident has not visited the region within the predefined time period, the VU monitoring tool 45 may determine items deemed to be relevant to this region. With an exemplary method for determining items relevant to a region, the VU monitoring tool 45 may track in a database, e.g., storage system 22B, records that contain, for example, the location, the item, and a time of use or withdrawal of the item from inventory, amongst other information. Each item can have an identification (ID), e.g., UUID, and the record may specify the items location and a VU user's visits within a radius of the item.

FIG. 2 shows an exemplary database table 200 for determining a relevance of items to particular regions of the VU. As shown in FIG. 2, the database table 200 may contain a RelationshipID column 205, an InventoryUUID column 210, a Boundary column 215 and a TimeInBoundary column 220. The RelationshipID column 205 may contain the primary key for the records of database table 200. In relational database design, a unique key or primary key is a candidate key to uniquely identify each row in a table. A unique key or primary key comprises a single column or set of columns. No two distinct rows in a table can have the same value (or combination of values) in those columns. The InventoryUUID column 210 may contain the foreign key to the existing inventory/objects UUID table. In the context of relational databases, a foreign key is a referential constraint between two tables. The foreign key identifies a column or a set of columns in one (referencing) table that refers to a column or set of columns in another (referenced) table. The Boundary column 215 may contain, for example, a region's coordinates (such as an XYZ-XYZ-XYZ convention where every item or asset within these coordinates will trigger an association to the region), a landscape name or coordinates, or a region name or region UUID. Additionally, in embodiments, the data of the Boundary column 215 may start out as a region, e.g., region UUID, and auto-reduce itself to coordinates representing a subset of a region based on how an object is moved over time. The TimeInBoundary column 220 may contain a time measurement that is incremented as the item remains within the boundary designated in the Boundary column 215.

Additionally, the VU monitoring tool 45 may use, for example, the asset deletion tool 30, the asset graphical characteristics alteration tool 35, and/or the asset archival storage tool 40 to perform an asset reduction. For example, the VU monitoring tool 45 may direct the asset archival storage tool 40 to move relevant landscape items (and associated relevant inventory items for that resident) to secondary storage and delete those items from the region or the user's inventory.

For example, a user may own five islands and six buildings. In embodiments, the VU monitoring tool 45 may identify areas that have not been visited within the predefined time period (and, thus, are not likely to be visited) by a user. Additionally, the VU monitoring tool 45 may identify items associated with the identified areas (e.g., a map of one of the owned islands that is no longer visited) and the asset archival storage tool 40 may move the associated items to, for example, a secondary archive, e.g., archival storage system 22C.

In further embodiments, a VU service provider, for example, may utilize the determined association of items and VU regions (or the relevance of items to particular regions of the VU) as an indicator of a change in user context for the avatar when a particular land or region is visited and a specific item is withdrawn from inventory. This may enable the VU service provider to anticipate a need for additional changes or resources without requiring an explicit request from the avatar withdrawing the item.

2. Reduction by Relevance to Collaboration with Other Residents

In embodiments, the VU monitoring tool 45 may determine whether an item is relevant or related to collaboration of a VU resident with other VU specific residents, and whether these residents have had no interaction within a predetermined duration. If the resident has not had interaction within the predetermined duration, the VU monitoring tool 45 may direct an asset reduction of those assets determined to be relevant to the VU collaboration.

The VU monitoring tool 45 should determine relevance of items to collaboration with other residents and should associate VU items with resident collaboration. The VU monitoring tool 45 may determine that an item is relevant or related to collaboration of a resident with other specific residents, for example, if the item is only used (e.g., brought out of inventory or used on land) when the residents are messaging with each other or in close physical proximity to each other, and is not used at other times by the specific resident. In embodiments, the VU monitoring tool 45 may monitor collaboration between residents and determine whether a specific resident has collaborated with another resident within a predefined time period. If the VU monitoring tool 45 determines that the specific resident has not collaborated with the other resident within a predefined time period, the VU monitoring tool 45 may determine items deemed to have been relevant during previous collaborations between the specific resident and the other resident.

Figure 3:
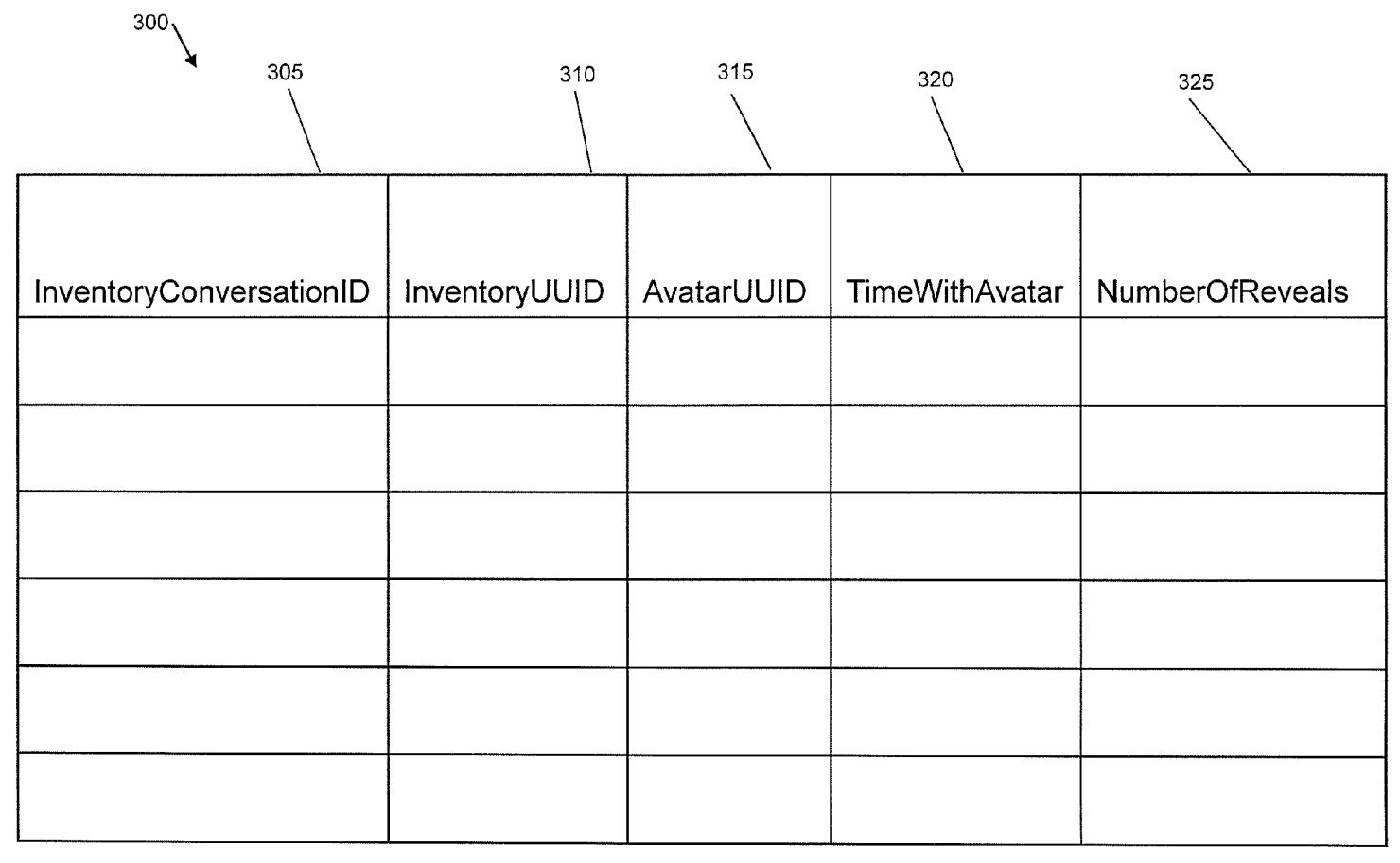

FIG. 3 shows an exemplary database table 300 for determining a relevance of items to particular collaborations between a particular VU resident and other VU residents. As shown in FIG. 3, the database table 300 may contain an InventoryConversationID column 305, an InventoryUUID column 310, an AvatarUUID column 315, a TimeWithAvatar column 320 and a NumberOfReveals column 325. The InventoryConversationID column 305 may contain the primary key for the records of database table 300. The InventoryUUID column 310 may contain the foreign key to an existing inventory/objects UUID table. The AvatarUUID column 315 may contain the foreign key to an avatar with whom the particular user is, e.g., displaying and/or using their object. The TimeWithAvatar column 320 may contain a time measurement that is incremented as an object remains in the presence of the avatar identified in the AvatarUUID column 315. The NumberOfReveals column 325 may contain a numeric that is incremented every time the object (identified in the InventoryUUID column 310) was in the user's inventory, but then brought out in front of the avatar identified in the AvatarUUID column 315. In embodiments, the data of the NumberOfReveals column 325 may indicate more relevance, and thus, for example, may be weighted higher, than an object the user is always displaying, such as a jacket.

Additionally, the VU monitoring tool 45 may direct an asset reduction for those items deemed relevant to a VU collaboration between a VU user and other VU resident that has not occurred within the predetermined period. For example, the VU monitoring tool 45 may direct the asset archival storage tool 40 to move relevant collaboration items (and associated inventory items for that specific resident) to a secondary storage, e.g., archival storage system 22C and may delete the item(s) from avatar's regions or inventory, e.g., on the storage system 22B.

For example, a user may have had a previous collaboration with another resident, during which the user often displayed specific photos and gift art objects from their inventory and put on certain clothing items only when messaging with (or in close physical proximity to) this second resident. The VU monitoring tool 45 may monitor the frequency of these interactions, and may determine that the collaboration has ended. Accordingly, the VU monitoring tool 45 may then direct an item reduction. For example, the VU monitoring tool 45 may instruct the asset archival storage tool 40 to move the items deemed relevant to the previous collaboration to, e.g., the archival storage system 22C and delete the relevant items from the region or user's inventory.

In further embodiments, a VU service provider, for example, may utilize the frequency of reveals of a specific item in the presence of another specific avatar or category of avatars to indicate a change in user context for the avatar withdrawing the item from inventory. This could enable, for example, the VU service provider to anticipate the need for additional changes or resources without requiring an explicit request from the avatar withdrawing the item. This anticipation of needs is characteristic of responsive service environments and a service differentiator promoting customer loyalty. For example, if every time an avatar withdraws a briefcase and presentation, the avatar performs a presentation with a particular avatar, the VU service provider could use the withdrawal of these items from inventory to trigger a request to teleport the two avatars to a presentation hall or to otherwise provide a presentation screen.

3. Reduction by Relevance to User Context

With further embodiments, the VU monitoring tool 45 may judge an item to be relevant or related to a certain user context and the VU monitoring tool 45 may determine whether this context has been invoked within a predetermined duration. If the VU monitoring tool 45 determines that the relevant context has not been invoked within the predetermined duration, the VU monitoring tool 45 may direct an item reduction of the related items.

A user context includes a very broad range of attributes that describe a user and which are relevant to their behavioral, search and other informational needs. The VU monitoring tool 45 may, in order to determine relevance of items to user context, associate VU items with a resident's context. For example, the VU monitoring tool 45 may determine that an item is relevant to or related to a specific user context if the resident only displays this item from inventory or interacts with an item on the landscape when identified with that user context.

In embodiments, the VU monitoring tool 45 may monitor user context of the resident and determine whether the resident's user context has changed, such that a previous user context is no longer in evidence. While there are potentially a large number potential user contexts for any user population, in embodiments, each user would likely choose, for example, a single user context or a small number of user contexts that apply to them in different circumstances. In embodiments, a user may indicate a new user context, for example, by selecting a new user context from a list of user contexts. Additionally, the VU monitoring tool 45 may determine that a previous user context is no longer in evidence if the previous user context has not been invoked for a predetermined time period.

If the VU monitoring tool 45 determines that the resident's user context has changed, the VU monitoring tool 45 may determine items deemed to have been relevant to the previous user context. In embodiments, a database may contain For example, as discussed further below, a VU resident may no longer be looking to buy land in the VU and the user's previous user context of "land buyer" may no longer be in evidence. Thus, an asset reduction may be performed for assets such as, for example, previous land sale flyers.

FIG. 4 shows an exemplary database table 400 for determining a relevance of items to a user context according to a further aspect of the invention. As shown in FIG. 4, the database table 400 may contain an InventoryContextID column 405, a ContextUUID column 410, an InventoryUUID column 415 and a TimeInContext column 420. The InventoryContextID column 405 may contain a primary key for the records of database table 400. The ContextUUID column 410 may contain a foreign key to the particular user context stored in a database of potential user contexts. The InventoryUUID column 415 may contain a foreign key to the existing inventory/objects UUID table. The TimeInContext column 420 may contain a time measurement or a counter that is incremented as the object identified in the InventoryUUID column 415 is used in conjunction with the user context identified in the ContextUUID column 410.

Additionally, the VU monitoring tool 45 may direct an item reduction of those items related to the previous user context. For example, the VU monitoring tool 45 may direct the asset archival storage tool 40 to move the relevant inventory items to a secondary inventory or an inventory archive, e.g., the archival storage system 22C, and delete those relevant inventory items from a region or user's inventory.

For example, a VU resident may no longer be looking to buy land in the VU. Thus, the VU monitoring tool 45 may determine that the user's previous user context of "land buyer" is no longer in evidence. One of the data points monitored by the VU monitoring tool 45 for context detection includes, for example, the observation that the resident is no longer accepting presence-based advertising flyers for virtual land sales. In embodiments, the VU monitoring tool 45 may determine items relevant to this user context of "land buyer." For example, the VU monitoring tool 45 may identify assets such as, for example, previous flyers and/or previously accepted personal gifts associated with potential land purchases. Additionally, the VU monitoring tool 45 may direct an item reduction of these identified assets. For example, via the asset archival storage tool 40, these items may be moved to secondary storage, e.g., archival storage system 22C, and deleted from the resident's personal inventory.

4. Reduction by Relevance to Mode of Transportation

According to further aspects of the invention, the VU monitoring tool 45 may determine an item to be relevant or related to a certain mode of transportation (e.g., walking, teleporting, or flying), and may determine that this mode of transportation has not been invoked within a predetermined duration. Accordingly, the VU monitoring tool 45 may direct an item reduction of those items related to the certain mode of transportation.

In embodiments, the VU monitoring tool 45 may monitor modes of transportation of a particular VU resident and determine if the VU resident has used a specific mode of transportation recently, e.g., within a predetermined time period. If the VU monitoring tool 45 determines that a specific mode of transportation has not been used within the predetermined time period, the VU monitoring tool 45 may determine items deemed to be relevant to this mode of transportation.

In embodiments, the VU monitoring tool 45 should associate VU items with the resident's mode of transportation to determine relevance of items to mode of transportation. For example, the VU monitoring tool 45 may determine that an item is relevant to a specific mode of transportation if the item is specifically designed to be used with that mode of transportation.

FIG. 5 shows an exemplary database table 500 for determining a relevance of items to a particular mode of transportation according to a further aspect of the invention. As shown in FIG. 5, the database table 500 may contain an InventoryTransportID column 505, a TransportUUID column 510, an InventoryUUID column 515 and a TimeWithTransport column 520. The InventoryTransportID column 505 may contain a primary key for the records of database table 500. The TransportUUID column 510 may contain a foreign key to the particular mode of transportation. The InventoryUUID column 515 may contain a foreign key to the existing inventory/objects UUID table. The TimeWithTransport column 520 may contain a time measurement or a counter that is incremented as the object identified in the InventoryUUID column 515 is used in conjunction with the mode of transportation identified in the TransportUUID column 510.

According to an aspect of the invention, the VU monitoring tool 45 may direct a reduction of those items deemed to be relevant to a particular mode of transportation when the VU monitoring tool 45 determines that the mode of transportation has not been used for a predetermined time period. For example, the VU monitoring tool 45 may direct the asset archival storage tool 40 to move the relevant inventory items to a secondary inventory or an inventory archive, e.g., the archival storage system 22C, and delete these items from, e.g., the user's inventory or VU landscape.

For example, a user may have an airplane in their personal inventory and may have placed a landing cue visible from 10,000 feet on their land. The VU monitoring tool 45 may determine whether the user has used their airplane recently (e.g., within a predetermined time period). If the VU monitoring tool 45 determines that the VU user has not used the airplane within the predetermined time period, the VU monitoring tool 45 may direct an asset reduction for the landing cue, e.g., the landing cue item may be removed from the users inventory or the VU landscape, and archived, e.g., in the archival storage system 22C.

Real World Status Triggers for Asset Reduction

As noted above, the methods described for asset reduction in a VU (permanent or semi-permanent deletion, change in graphical characteristics, temporary reduction via archival storage with option for later restoration) may be triggered by a number different criteria within the VU. In further embodiments, a change in a real world status as reported by the user may act as a trigger for asset reduction. The methods used to determine relevance based on the reported real world status change will vary by embodiment, but all potential methods used with the inventive system should have the goal of associating VU items with users or the entities for which real world status changes are reported.

In embodiments, a real world status tool 50 may determine a user's real world status change, by, for example, detecting a change in a user's profile or by a user instructing the VU of a real world change via, e.g., a menu based profile. That is, the VU monitoring tool 45 may monitor changes in real world status profile reported by users, e.g., via the real world status tool 50, to determine if a user's real world status has changed.

If the VU monitoring tool 45 determines that the user's real world status has changed, the VU monitoring tool 45 may determine items that are relevant or related to a previous real world status (i.e., the real world status that has changed) and may direct an item reduction of those related items. For example, the VU monitoring tool 45 may direct the asset graphical characteristics alteration tool 35 to elide graphical details (e.g. coloration) of those items relevant to the previous real world status.

For example, a VU resident may take a new job with a real world company but may have forgotten about various VU inventory items they acquired while associated with their previous employer. After the resident reports their real world status change, e.g., via the real world status tool 50, the VU monitoring tool 45 may identify the relevant inventory items associated with the former employer (e.g., documents and/or outfits associated with the former employer) and, for example, may direct the asset archival storage tool 40 to remove the relevant items from the VU resident's inventory to an inventory archive, e.g., the archival storage 22C.

With a further example, a product may not be selling well in an enterprise's physical store and/or their web store. Accordingly, the enterprise's virtual store manager may desire an efficient way to reduce the assets associated with that product in the VU. Thus, in embodiments, the virtual store manager may use the real world status tool 50 to report each product's real world sales status, e.g., with menu based profile. The VU monitoring tool 45 may monitor changes in real world sales status reported by the virtual store manager via the real world status tool 50. Accordingly, the VU monitoring tool 45 may determine whether a real world sales status has changed, e.g., indicating reduced sales for specific products via, for example, the real world status tool 50. In a further embodiment, the real world status tool 50 may perform data mining of available real world sales data available to authorized personnel, e.g., at the enterprise's web site.

If the VU monitoring tool 45 determines that a real world status has changed, the VU monitoring tool 45 may determine items deemed to be relevant to these specific products (e.g., virtual flyers and/or promotional posters linked to the product) and may direct an item reduction of those relevant items. For example, the VU monitoring tool 45 may direct the asset archival storage tool 40 to move the relevant inventory items to a secondary inventory or an inventory archive, e.g., the archival storage system 22C, and delete these items from the user's inventory, e.g., in the virtual store. In a further embodiment, the VU monitoring tool 45 may direct the reduction of inventory assets associated with the product, which VU residents have previously taken, e.g., as personal inventory items or assets to be deposited on the landscape. This embodiment may be particularly relevant in the event of a recall of a defective product.

Upcoming Event Trigger for Temporary Asset Reduction

In further aspects of the invention, for example, an owner or renter of specific land in the VU may be planning a special event on the land, such as, for example, a rock concert or a rally, which may draw additional VU residents and their inventory to the land. These additional VU residents and their inventory, however, may cause the prim object limit of the land to be exceeded. In order to prevent the prim object limit of the land from being exceeded, for example, the owner of the land (or a VU service provider) may initiate temporary personal inventory and asset reduction for all avatars currently on the land, and optionally, for all avatars who visit the land for the special event.

In embodiments, for example, an organizer of a special event may use the special events tool 55 as registration mechanism to indicate a location for a special event (e.g., a specific land or region in the VU) and an anticipated number of additional visitors. The VU monitoring tool 45 may monitor a prim load on the land or region to be used for event. Additionally, the special events tool 55 may estimate the additional number of residents to visit land for the event, e.g., based on report by the event organizers. Additionally, in embodiments, the special events tool 55 may estimate the number of additional VU residents to visit land for a specific event by a variety of methods, including, for example, the prior history of similar events and the number of pre-registrations or ticket purchases (if required) for the upcoming special event.

If the VU monitoring tool 45 determines that the prim load for VU residents currently on the land for the upcoming event plus the prim limit for those residents anticipated to visit the land for the event approaches a prim maximum for land, the VU monitoring tool 45 may notify affected residents and initiate asset reduction methods, e.g., for the duration of the event. In embodiments, the VU monitoring tool 45 may identify categories of assets to be reduced for the duration of the special event, using methods which incorporate the prim load associated with each asset category as one of the criteria for selecting this category for temporary reduction. Additionally, in embodiments, the VU monitoring tool 45 may set an individual prim limit for each avatar on the land, and may direct an asset reduction for those avatars whose assets exceed the individual prim limits without regard for specific categories of assets, for example, temporarily reducing an avatar's, e.g., largest assets or least used assets.

Additionally, in embodiments, the VU monitoring tool 45 may optionally direct, e.g., the deletion or archiving all inventory items associated with the special event if those items are left on the land used for the special event after the event has concluded. This may include items, for example, that were created for the special event, items created at the special event and/or items used at the special event, amongst other items. This constitutes a method for automatic trash removal after a specific event. The VU monitoring tool 45 may determine relevance of items based on their relationship to a just concluded event by associating VU items with the specific event.

Using the aforementioned criteria and automatic asset reduction methods, VUs will be easier to use by both individuals and corporations. Moreover, the VU infrastructure will be less loaded, giving an advantage to the VU operators and users who make use of this method and system.

Additionally, while the invention has been described using the asset deletion tool 30, the asset graphical characteristics alteration tool 35, the asset archival storage tool 40, the VU monitoring tool 45, the real world status tool 50 and the special events tool 55, the invention contemplates that any of the operations performed by the asset deletion tool 30, the asset graphical characteristics alteration tool 35, the asset archival storage tool 40, the VU monitoring tool 45, the real world status tool 50 and the special events tool 55 may be performed manually by a user (e.g., a VU manager, an advertiser or a VU service provider). For example, a VU service provider may alter the graphical characteristics of an asset.

Flow Diagrams

Figure 6:
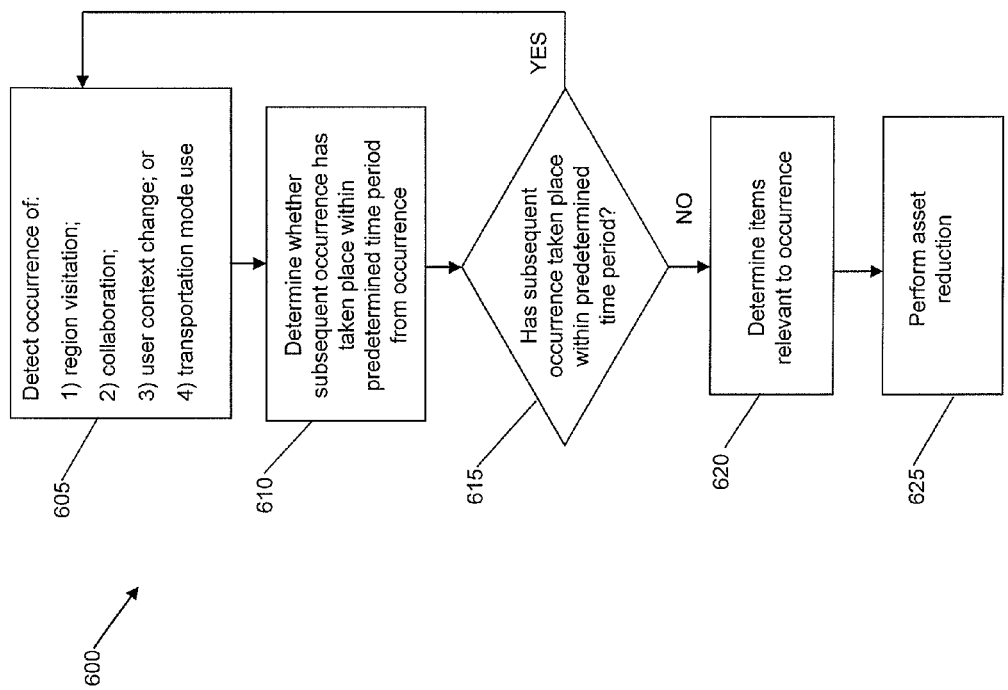
FIGS. 6-8 are exemplary flow diagrams of steps for implementing aspects of the invention.
Figure 7:
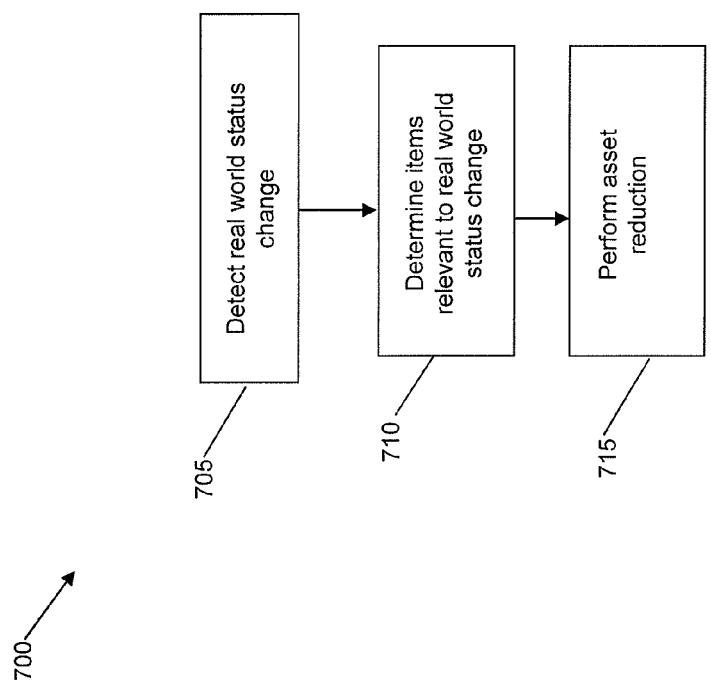
Figure 8:
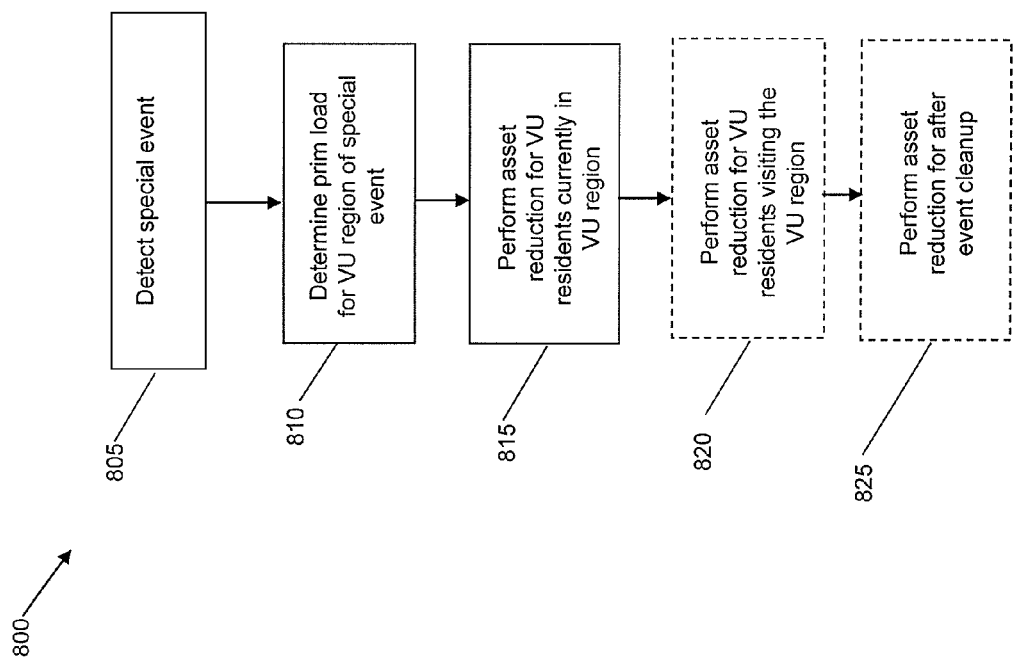

FIGS. 6-8 show exemplary flows for performing aspects of the present invention. The steps of FIGS. 6-8 may be implemented in the environment of FIG. 1, for example. The flow diagrams may equally represent high-level block diagrams of the invention. The flowcharts and/or block diagrams in FIGS. 6-8 illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. Each block of each flowchart, and combinations of the flowchart illustrations can be implemented by special purpose hardware-based systems that perform the specified functions or acts, or combinations of special purpose hardware and computer instructions and/or software, as described above. Moreover, the steps of the flow diagrams may be implemented and executed from either a server, in a client server relationship, or they may run on a user workstation with operative information conveyed to the user workstation. In an embodiment, the software elements include firmware, resident software, microcode, etc.

Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disc—read/write (CD-R/W) and DVD.

Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disc—read/write (CD-R/W) and DVD.

FIG. 6 shows an exemplary flow 600 for performing steps of the invention using VU triggers. At step 605, the VU monitoring tool detects occurrences of a VU resident's visitation to a region of the VU, a collaboration of a VU resident with another VU resident, a change in user context of the VU resident or a use of a particular mode of transportation of the VU resident. At step 610, the VU monitoring tool determines whether a subsequent occurrence has taken place within a predetermined time from the preceding occurrence. At step 615, if the VU monitoring tool determines that a subsequent occurrence has taken place within the predetermined time period, the process continues at step 605. At step 615, if the VU monitoring tool determines that a subsequent occurrence has not taken place within the predetermined time period, the process continues at step 620.

At step 620, the VU monitoring tool determines items of the VU resident that are relevant to the occurrence. At step 625, the VU monitoring tool directs an asset reduction of those relevant items. For example, the VU monitoring tool may direct the asset deletion tool to delete the relevant asset from the landscape or the VU resident's inventory, may direct the asset graphical characteristics alteration tool to elide the graphical characteristics of the relevant asset, and/or may direct the asset archival storage tool to move the relevant asset to the archival storage system.

It should be understood, that while the steps have been described as occurring in a particular order, the invention contemplates that the steps may be performed in other orders. For example, step 620 may occur prior to step 605. Furthermore, the invention contemplates that, in embodiments, steps may be implied or omitted while still remaining true to this invention.

FIG. 7 shows an exemplary flow 700 for performing steps of the invention using real world triggers. At step 705, the VU monitoring tool detects a real world status change (e.g., from a previous real world status to a current real world status) via the real world status tool. At step 710, the VU monitoring tool determines items relevant to the previous real world status. At step 715, the VU monitoring tool directs an asset reduction of those relevant items. For example, the VU monitoring tool may direct the asset deletion tool to delete the relevant items from the landscape or the VU resident's inventory, may direct the asset graphical characteristics alteration tool to elide the graphical characteristics of the relevant items, and/or may direct the asset archival storage tool to move the relevant items to the archival storage system.

FIG. 8 shows an exemplary flow 800 for performing steps of the invention for VU special events. At step 805, the VU monitoring tool detects a VU special event via the special events tool. At step 810, the VU monitoring tool determines a prim load limit for the VU region where the special event is occurring (or will be occurring). At step 815, the VU monitoring tool directs an asset reduction for those VU residents currently in the VU region where the special event is occurring. For example, the VU monitoring tool may direct the asset deletion tool to delete the assets from the landscape or the VU resident's inventory, may direct the asset graphical characteristics alteration tool to elide the graphical characteristics of the assets, and/or may direct the asset archival storage tool to move the assets to the archival storage system. At step 820, the VU monitoring tool optionally directs an asset reduction for VU residents who visit the VU region where the special event is occurring. It should be understood that step 820 is an optional step, as indicated by the dashed lines. At step 825, the VU monitoring tool optionally directs an asset reduction for an after-event cleanup. It should be understood that step 825 is an optional step, as indicated by the dashed lines.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims, if applicable, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

What is claimed is:

1. A method implemented in a computer infrastructure having computer executable code tangibly embodied on a computer readable medium, the method comprising:

detecting one of a plurality of criteria comprising an absence of a virtual universe (VU) occurrence in a VU within a predetermined time period, a special event in the VU and a change of real world status from a previous real world status;

determining a VU asset of a VU resident relevant to the detected one of the plurality of criteria, wherein the VU asset is an object the VU resident owns; and performing an automated asset reduction of the VU asset based on the determining wherein the VU is a computer-based simulated environment using three-dimensional graphics, and for users to traverse, inhabit and interact through use of avatars, wherein:

the performing the automated asset reduction comprises:

an alteration of a graphical characteristic of the VU asset; and an archiving of the VU asset in a storage system and a removal of the VU asset from a VU landscape; and the alteration of the graphical characteristic of the VU asset comprises providing a monochrome representation of the VU asset.

2. The method of claim 1, wherein:

the VU asset is a composite of primitive objects having a mapped texture, the primitive objects being at least one of a box, a prism, a sphere, a cylinder, a tori, a tube and a ring; and the VU asset is included in an inventory of assets owned by the VU resident.

3. The method of claim 1, wherein:

the VU occurrence comprises a collaboration between the VU resident and another VU resident; and the determining the VU asset relevant to the collaboration between the VU resident and the other VU resident comprises determining at least one of a frequency and a duration of use of the VU asset by the VU resident while at least one of in a proximity of and communicating with the another VU resident.

4. The method of claim 1, wherein:

the VU occurrence comprises a use of a previous user context of the VU resident; and the determining the VU asset relevant to the use of the previous user context of the VU resident comprises determining at least one of a frequency and a duration of use of the VU asset by the VU resident while within the previous user context.

5. The method of claim 1, wherein the determining the VU asset relevant to the special event comprises:

determining at least one of a primitive object (prim) load limit for a VU land for the special event and an individual avatar prim load limit;
determining an expected prim load for the special event; and
at least one of:
   determining a category of assets whose asset reduction maintains an actual prim load beneath the prim load limit; and
   determining an individual avatar's assets whose asset reduction at least one of maintains the actual prim load beneath the prim load limit and maintains an actual individual prim load beneath the individual avatar prim load limit.

6. The method of claim 5, wherein the determining the VU asset relevant to the special event further comprises identifying assets of a visiting avatar arriving at the special event whose asset reduction maintains the actual prim load beneath the prim load limit.

7. The method of claim 1, wherein the determining the VU asset relevant to the special event comprises determining a VU asset at least one of created for the special event, created at the special event, used at the special event, and left at the special event by the VU resident after the VU resident has left the special event.

8. The method of claim 1, wherein the performing the automated asset reduction comprises at least one of:
   a deletion of the VU asset;
   an alteration of a graphical characteristic of the VU asset; and
   an archiving of the VU asset in a storage system and a removal of the VU asset from the VU resident's inventory or a VU landscape.

9. The method of claim 1, further comprising providing a visual indicator of a future asset reduction for the VU asset prior to the performing the automated asset reduction of the VU asset, wherein the visual indicator comprises at least one of a blinking, a flashing and a fading of the VU asset.

10. The method of claim 1, wherein:
   the special event comprises a temporary influx of a plurality of avatars and a plurality of VU assets associated with the plurality of avatars, at a VU land; and
   the determining the VU asset relevant to the special event comprises:
      determining a primitive object (prim) load limit for the VU land for the special event and an individual avatar prim load limit;
      determining an expected prim load for the special event;
      determining a category of assets whose asset reduction maintains an actual prim load beneath the prim load limit; and
      determining an individual avatar's assets whose asset reduction at least one of maintains the actual prim load beneath the prim load limit and maintains an actual individual prim load beneath the individual avatar prim load limit.

11. A method implemented in a computer infrastructure having computer executable code tangibly embodied on a computer readable medium, the method comprising:
   detecting one of a plurality of criteria comprising an absence of a virtual universe (VU) occurrence in a VU within a predetermined time period, a special event in the VU and a change of real world status from a previous real world status;
   determining a VU asset of a VU resident relevant to the detected one of the plurality of criteria, wherein the VU asset is an object the VU resident owns; and
   performing an automated asset reduction of the VU asset based on the determining
   wherein the VU is a computer-based simulated environment using three-dimensional graphics, and for users to traverse, inhabit and interact through use of avatars,
   wherein:
      the VU occurrence comprises a visitation of the VU resident to a region of the VU; and
      the determining the VU asset relevant to the visitation of the VU resident to the region of the VU comprises determining at least one of a frequency and a duration of use of the VU asset by the VU resident while in the region of the VU.

12. A method implemented in a computer infrastructure having computer executable code tangibly embodied on a computer readable medium, the method comprising:
   detecting one of a plurality of criteria comprising an absence of a virtual universe (VU) occurrence in a VU within a predetermined time period, a special event in the VU and a change of real world status from a previous real world status;
   determining a VU asset of a VU resident relevant to the detected one of the plurality of criteria, wherein the VU asset is an object the VU resident owns; and
   performing an automated asset reduction of the VU asset based on the determining
   wherein the VU is a computer-based simulated environment using three-dimensional graphics, and for users to traverse, inhabit and interact through use of avatars,
   wherein:
      the VU occurrence comprises a use of a VU mode of transportation by the VU resident; and
      the determining the VU asset relevant to the use of the VU mode of transportation by the VU resident comprises determining at least one of a frequency and a duration of use of the VU asset by the VU resident while using the VU mode of transportation.

* * * * *